US008670397B2

(12) United States Patent
Josiam et al.

(10) Patent No.: US 8,670,397 B2
(45) Date of Patent: Mar. 11, 2014

(54) SYSTEM AND METHOD FOR EFFICIENT ENHANCED MULTICAST BROADCAST SYSTEM (E-MBS) CONFIGURATION MESSAGE DECODING

(75) Inventors: Kaushik Josiam, Dallas, TX (US); Zhouyue Pi, Allen, TX (US); TaeYoung Kim, Seongnam-si (KR); JaeJeong Shim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 145 days.

(21) Appl. No.: 12/938,227

(22) Filed: Nov. 2, 2010

(65) Prior Publication Data

US 2011/0103289 A1     May 5, 2011

Related U.S. Application Data

(63) Continuation-in-part of application No. 12/590,276, filed on Nov. 4, 2009.

(60) Provisional application No. 61/281,317, filed on Nov. 16, 2009, provisional application No. 61/207,190, filed on Feb. 9, 2009.

(51) Int. Cl.
*H04H 20/71* (2008.01)
(52) U.S. Cl.
USPC ........................................................ 370/329
(58) Field of Classification Search
USPC ........................................................ 370/329
See application file for complete search history.

(56) References Cited

U.S. PATENT DOCUMENTS

| | | | |
|---|---|---|---|
| 5,946,632 A | 8/1999 | Yi et al. | |
| 7,620,061 B2 | 11/2009 | Yi et al. | |
| 7,864,721 B2 | 1/2011 | Zhang | |
| 8,005,028 B2 | 8/2011 | Itakura et al. | |
| 8,005,044 B2 | 8/2011 | Kim | |
| 2004/0227618 A1 | 11/2004 | Hwang et al. | |
| 2006/0239264 A1* | 10/2006 | Kang et al. | 370/390 |
| 2007/0268933 A1* | 11/2007 | Wu et al. | 370/474 |
| 2008/0267104 A1* | 10/2008 | Zhang | 370/311 |
| 2009/0147877 A1* | 6/2009 | Connors et al. | 375/267 |
| 2010/0202396 A1 | 8/2010 | Won et al. | |

FOREIGN PATENT DOCUMENTS

| | | |
|---|---|---|
| CN | 1805604 A | 7/2006 |
| CN | 101167330 A | 4/2008 |
| JP | 2004159334 A | 6/2004 |
| JP | 2005525066 A | 8/2005 |
| JP | 2008067016 A | 3/2008 |

(Continued)

OTHER PUBLICATIONS

Translation of Japanese Examination Report dated May 7, 2013 in connection with Japanese Application 2011-547820; 5 pages.

(Continued)

*Primary Examiner* — Sulaiman Nooristany

(57) ABSTRACT

A base station comprises a transmitter configured to transmit a downlink frame. The downlink frame comprising a first configuration message associated with the configuration of Enhanced-Multicast Broadcast Service (E-MBS). The first configuration message comprises a field with an indicator to indicate a next configuration message to be decoded by a subscriber station. The subscriber station, upon decoding the first configuration message, refrains from decoding subsequent configuration messages that precede the next configuration message to be decoded by the subscriber station in accordance with the indicator.

42 Claims, 12 Drawing Sheets

(56) References Cited

FOREIGN PATENT DOCUMENTS

| | | |
|---|---|---|
| JP | 2008136245 A | 6/2008 |
| JP | 2008 182707 A | 8/2008 |
| JP | 2008-541582 A | 11/2008 |
| JP | 2009502088 A | 1/2009 |
| WO | WO 2008/076687 A2 | 6/2008 |
| WO | WO 2009/022976 A1 | 2/2009 |

OTHER PUBLICATIONS

Japenese Notice of Allowance in connection with Japanese Patent Application No. 2011-547820; dated Sep. 3, 2013; 6 pages.

Translation of Chinese Office Action dated Jul. 30, 2013 in connection with Chinese Patent Application No. 2010800069736; 14 pages.

* cited by examiner

| M | Two-bit indicator |
|---|---|
| 100 | 00 |
| 200 | 01 |
| 500 | 10 |
| 1000 | 11 |

FIGURE 5

SYSTEM AND METHOD FOR EFFICIENT ENHANCED MULTICAST BROADCAST SYSTEM (E-MBS) CONFIGURATION MESSAGE DECODING

CROSS-REFERENCE TO RELATED APPLICATION(S) AND CLAIM OF PRIORITY

The present application is a continuation-in-part of U.S. Non-Provisional patent application Ser. No. 12/590,276, filed Nov. 4, 2009, entitled "SYSTEM AND METHOD FOR EFFICIENT ENHANCED MULTICAST BROADCAST SYSTEM (E-MBS) MAP DECODING". U.S. Non-Provisional patent application Ser. No. 12/590,276 is assigned to the assignee of the present application and is hereby incorporated by reference into the present application as if fully set forth herein. The present application hereby claims priority under 35 U.S.C. §120 to U.S. Non-Provisional patent application Ser. No. 12/590,276.

U.S. Non-Provisional patent application Ser. No. 12/590,276 is related to U.S. Provisional Patent No. 61/207,190, filed Feb. 9, 2009, entitled "METHODS FOR EFFICIENT E-MBS MAP DECODING". Provisional Patent No. 61/207,190 is assigned to the assignee of the present application and is hereby incorporated by reference into the present application as if fully set forth herein. The present application hereby claims priority under 35 U.S.C. §119(e) to U.S. Provisional Patent No. 61/207,190.

The present application is related to U.S. Provisional Patent No. 61/281,317, filed Nov. 16, 2009, entitled "METHODS FOR EFFICIENTLY DECODING THE E-MBS CONFIGURATION MESSAGE". Provisional Patent No. 61/281,317 is assigned to the assignee of the present application and is hereby incorporated by reference into the present application as if fully set forth herein. The present application hereby claims priority under 35 U.S.C. §119(e) to U.S. Provisional Patent No. 61/281,317.

TECHNICAL FIELD OF THE INVENTION

The present application relates generally to wireless communications and, more specifically, to a system and method for decoding Enhanced-Multicast Broadcast System (E-MBS) configuration messages.

BACKGROUND OF THE INVENTION

Multimedia entertainment on mobile stations (MSs) or subscriber stations (SSs) is a key driver in influencing the demand for higher data rates and improved user services. To address multimedia entertainment in next generation wireless systems, different standard bodies have optimized the transmission of multimedia broadcast services. In $3^{rd}$ Generation Partnership Project (3GPP), the multimedia content is carried on Multimedia Broadcast Multicast Service (MBMS). In $3^{rd}$ Generation Partnership Project 2 (3GPP2), multimedia content is transmitted using Multicast Broadcast Multicast Service (BCMCS).

The Institute of Electrical and Electronics Engineers (IEEE) 802.16e standard describes Multicast and Broadcast Service (MBS), which is a downlink only offering that provides an efficient method of simultaneously transmitting multimedia content to a group of users. MBS saves resources by allocating the same radio waveform to all users registered to the same service instead of allocating as many radio waveforms as there are users. Moreover, in a multi-base station (multi-BS) MBS system, MSs registered to an MBS service can receive MBS information from any base station (BS) in a particular MBS zone without being registered with a specific BS in that zone.

The IEEE 802.16m standard, currently under development, is an enhanced update to the existing IEEE 802.16e standard. The enhanced version of MBS in IEEE 802.16m is termed Enhanced-Multicast Broadcast Service (or E-MBS).

SUMMARY OF THE INVENTION

A base station comprises a transmitter configured to transmit a downlink frame. The downlink frame comprising a first configuration message for Enhanced-Multicast Broadcast Service (E-MBS). The first configuration message comprises a field with an indicator to indicate a next configuration message to be decoded by a subscriber station. The subscriber station, upon decoding the first configuration message, refrains from decoding subsequent configuration messages that precede the next configuration message to be decoded by the subscriber station in accordance with the indicator.

A method of operating a base station is provided. The method comprising transmitting a downlink frame. The downlink frame comprising a first configuration message associated with the configuration of Enhanced-Multicast Broadcast Service (E-MBS). The first configuration message comprises a field with an indicator to indicate a next configuration message to be decoded by a subscriber station. The subscriber station, upon decoding the first configuration message, refrains from decoding subsequent configuration messages that precede the next configuration message to be decoded by the subscriber station in accordance with the indicator.

A subscriber station comprises a receiver configured to receive a downlink frame. The downlink frame comprising a first configuration message associated with Enhanced-Multicast Broadcast Service (E-MBS). The first configuration message comprises a field with an indicator to indicate a next configuration message to be decoded by the subscriber station. The subscriber station, upon decoding the first configuration message, is configured to refrain from decoding subsequent configuration messages that precede the next configuration message to be decoded by the subscriber station in accordance with the indicator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a table for indicating a duration to a next E-MBS MAP to be decoded by a subscribing mobile station according to an embodiment of the disclosure;

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
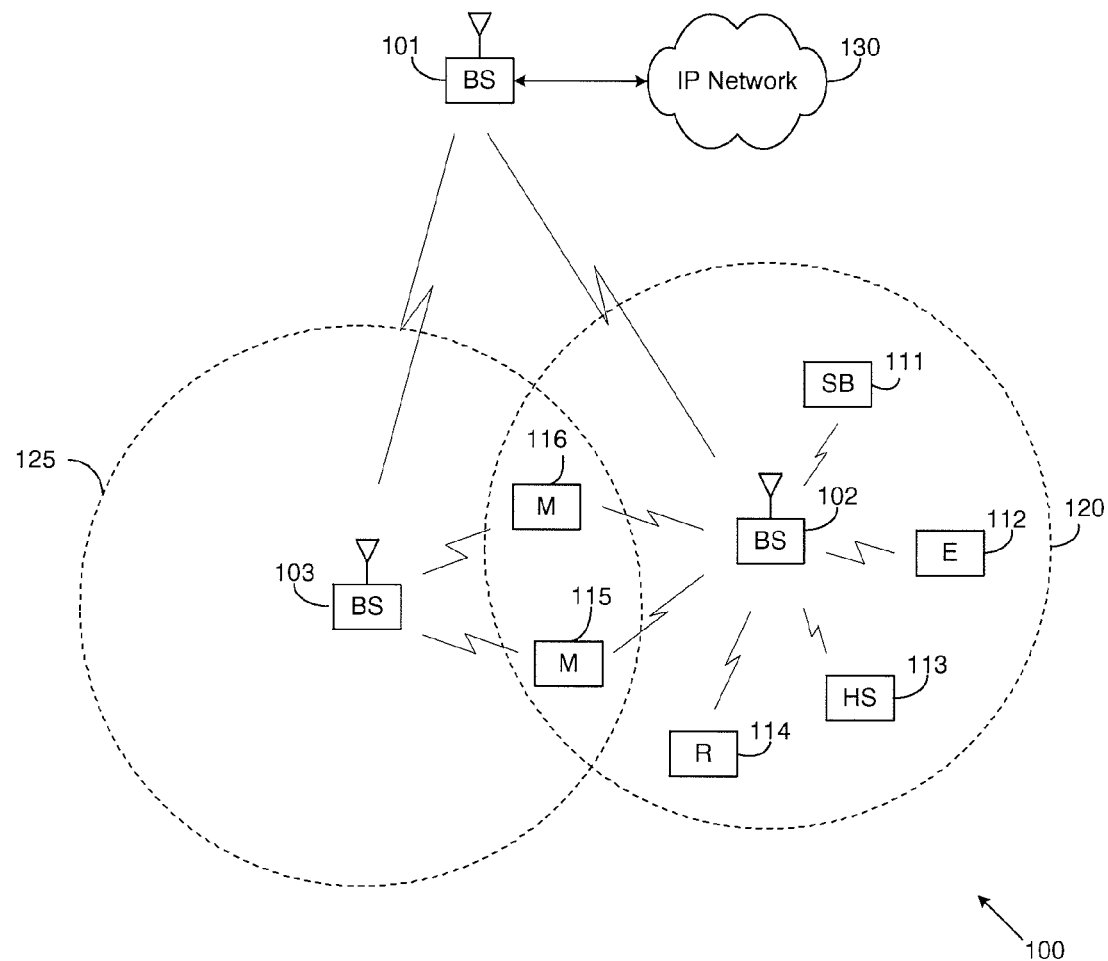
FIG. 1 illustrates an exemplary wireless network that transmits messages in the downlink according to the principles of the disclosure.

FIG. 1 illustrates an exemplary wireless network 100, which transmits messages according to the principles of the present disclosure. In the illustrated embodiment, wireless network 100 includes a base station (BS) 101, a base station (BS) 102, a base station (BS) 103, and other similar base stations (not shown). Base station 101 is in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
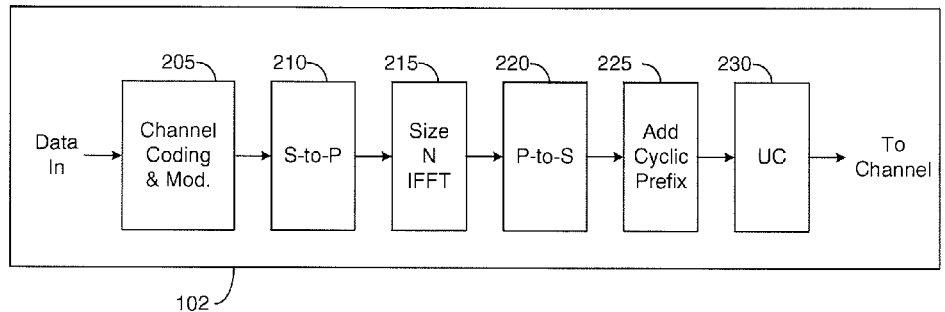
FIG. 2 is a high-level diagram of an OFDMA transmitter according to one embodiment of the present disclosure.
Figure 3:
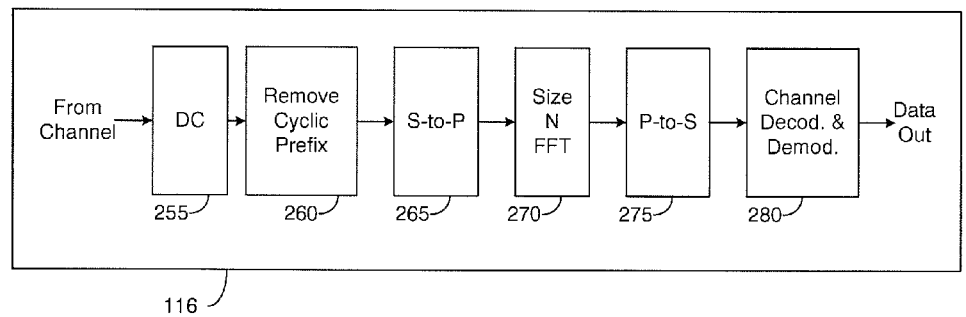
FIG. 3 is a high-level diagram of an OFDMA receiver according to one embodiment of the present disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system that reduces repeated and unnecessary decoding of the MBS MAP by disclosing a signaling method and system that trigger MBS MAP decoding.

Enhanced-Multicast Broadcast Service (E-MBS) is a downlink transmission from a base station (BS) to mobile stations (MSs) subscribing to a service. E-MBS control signaling is transmitted as an E-MBS MAP message. The E-MBS MAP message conveys the information required to decode the E-MBS data burst of the service (or stream) to which a user subscribes. The E-MBS MAP includes control signaling to decode different E-MBS data bursts. The decoding information for all E-MBS data bursts in an E-MBS zone will be transmitted in the E-MBS MAP. As a result, the E-MBS MAP contains Information Elements (IEs) for each of the services offered. Each MBS service is identified by a unique Multicast Station ID (MSTID) or flow ID (FID). In some embodiments, MSTIDs or FIDs having the same decoding information may be grouped in the same IE to increase efficiency. To accommodate different transmission scenarios, different types of IEs have been described. In IEEE 802.16e systems, an IE is categorized as an MBS_DATA_IE, an MBS_DATA_Time_Diversity_IE, or an Extended_MBS_DATA_IE. Depending on the transmission scenario for the MSTIDs or FIDs in the zone, the MBS MAP may contain some or all of the IEs.

In IEEE 802.16e systems, an MBS MAP, when present, is located at the first symbol and the first sub-channel in the resources reserved for MBS in the subframe. The MBS MAP specifies the location and size of multi-Base Station (BS) MBS data bursts that are located in frames that are from 2 to 5 frames in the future from the frame containing the MBS MAP message. An MBS MAP IE, carried in the downlink (DL) MAP, is not part of the multi-BS MBS transmission and indicates when the next data for a multicast and broadcast service flow will be transmitted.

The MBS MAP also contains a field that indicates when the next MBS MAP transmission with changed parameters will be carried. In the MBS MAP, the MBS_DATA_IEs carry a 1 bit field called the Next MBS MAP change indication that indicates whether the size of MBS MAP message of next MBS frame for these Multicast CIDs included in this IE will be different from the size of the current MBS MAP message. When the Next MBS MAP change indication is set to 1, a total of twelve bits, six to indicate the next OFDMA symbol starting the MBS subframe and six to indicate the next sub-channel offset, are present.

Accordingly, the MBS MAP message has to be decoded by all subscribing mobile stations (MSs) every time the MBS MAP message is transmitted. Therefore, although the transmission parameters of the data bursts may not change often, the MBS MAP still has to be decoded every time in order to check the Next MBS MAP Change indication field. Moreover, an additional 12 bit overhead is required to indicate the start of the next MBS MAP message.

The transmission parameters, particularly for multi-BS broadcast transmitted with symbol level synchronization, are not expected to change frequently. Multi-BS MBS transmissions with symbol level synchronizations are also referred to as single frequency network (SFN) transmissions, and all the BSs involved in SFN transmissions are said to belong to an SFN zone. Broadcast parameters like modulation and coding schemes of data for transmissions in an SFN zone are set such that a large percentage (e.g., 95%) of the users can receive data with an assured quality of service. A popular quality of service metric is a 1% packet error rate. As such, broadcast transmissions are conservatively dimensioned so that the weakest geometry users at the edge of an SFN zone can still receive packets reliably.

Because E-MBS in IEEE 802.16m is a downlink broadcast/multicast transmission, there is no definitive way of determining how the users are distributed in an SFN zone. For example, if there are no users in the zone edge, then the transmission parameters can be made more aggressive since the users all enjoy good geometry. Moreover, although the use of a feedback channel to ascertain user distribution in an SFN zone is being considered, such feedback channel cannot adapt to dynamic changes in user distribution as the users are mobile or can be idle. Therefore, the transmission parameters of broadcast remain more or less static, and if they do change, they change slowly without correlation to the dynamic variations in user distribution. It is expected that the broadcast parameters typically change in integer multiples of the MSI duration.

This slow variation in broadcast parameters can be used to reduce E-MBS MAP decoding. Considering that an MBS MAP contains decoding details for all E-MBS flows in the entire MSI, it is inefficient in terms of power usage at the MSs to decode the E-MBS MAP at every transmission instance.

The downlink of IEEE 802.16m uses an orthogonal frequency division multiplexing (OFDM) modulation scheme for transmitting information to the MS. OFDM is a multi-carrier technique where the available bandwidth is split into a plurality of small bands known as subcarriers using simple inverse fast Fourier transform/fast Fourier transform (IFFT/FFT) operations. The subcarriers have equal bandwidth and are used to carry either control signaling or data for the MSs. An OFDM symbol is a collection of subcarriers that span the system bandwidth.

Further, to make resource utilization efficient, OFDM symbols are grouped to form a sub-frame. For example, in IEEE 802.16m, 6 OFDM symbols are used to form a regular sub-frame that is 0.625 ms long. Eight regular sub-frames form a frame that is 5 ms long, and four such frames form a super-frame that spans 20 ms.

An E-MBS Scheduling Interval (MSI) refers to a number of successive frames for which the access network may schedule traffic for the streams associated with the E-MBS prior to the start of the interval. The length of this interval depends on the particular use case of the E-MBS and is dictated by the minimum switching time requirement set in the IEEE 802.16m System Requirements Document (SRD). In other words, MSI refers to the transmission frequency of the E-MBS MAP. Additionally, the E-MBS MAP message may be structured such that the E-MBS MAP efficiently defines multiple transmission instances for a given stream within an MSI. In an MSI, there is just one MAP and this MAP is used to signal all MBS data flows in the MSI. As can be inferred from the definition, the length of an MSI is an integer multiple of the frame length (for example, an integer multiple of 5 ms).

One solution proposed by Wei Xie et. al. ("Proposal for 802.16m E-MBS", IEEE C802.16m/1056r1, September 2008) for reducing the unnecessary decoding of the E-MBS MAP involves the use of a small low overhead private MAP that is transmitted along with the data flow to indicate both the decoding parameters for the data burst as well as the next instance of data transmission. The transmission of such a private MAP removes the need to decode E-MBS MAP every time, and the MS only needs to decode the private MAP for the data burst. However, while such a private MAP is more efficient than the 16e MAP, the private MAP assumes that the parameters could change at every transmission instance of the burst while in reality the parameter could actually change much more infrequently. Also, depending on the resource allocation, if the resource for a data burst is fixed, adding a private MAP could come at the cost of lowering the reliability of a data burst.

Assuming that the E-MBS MAP is transmitted once every MSI and is not decoded by subscribing MSs at every transmission instance, this disclosure reduces repeated and unnecessary decoding of the E-MBS MAP by disclosing a signaling method and system that trigger E-MBS MAP decoding.

Figure 4:
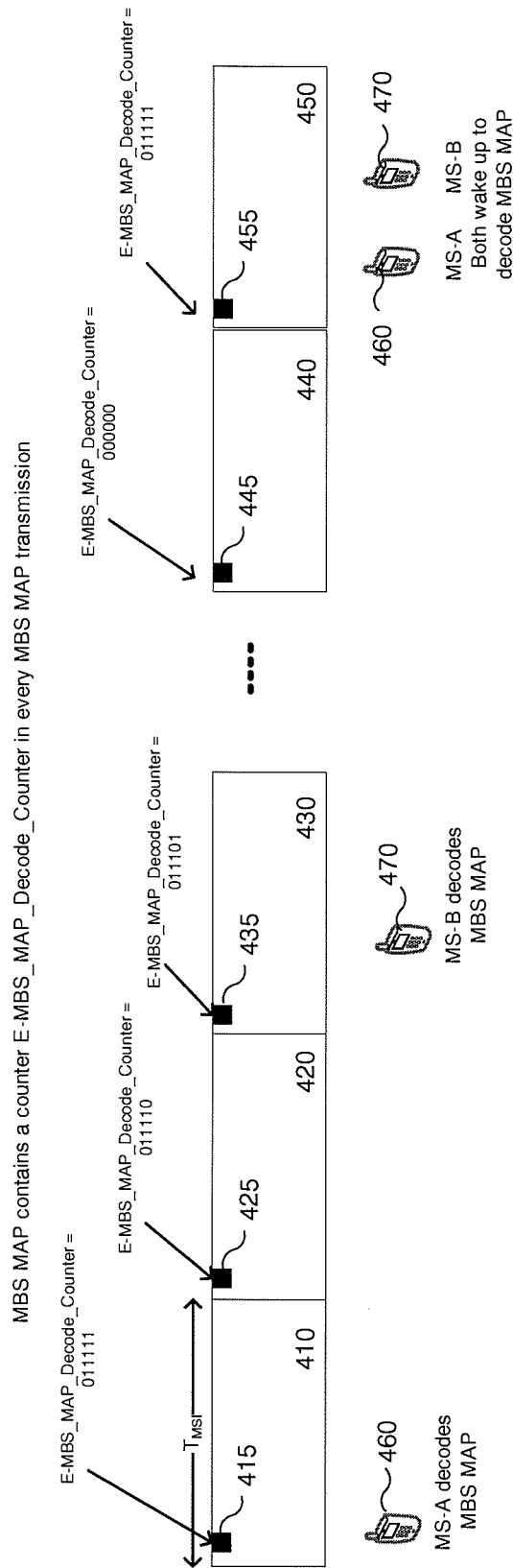
FIG. 4 illustrates a series of E-MBS MAPs having an indicator according to an embodiment of the disclosure.

FIG. 4 illustrates a series of E-MBS MAPs having an indicator according to an embodiment of the disclosure. The embodiment of the E-MBS MAPs illustrated in FIG. 4 is for illustration only. Other embodiments of the E-MBS MAPs could be used without departing from the scope of this disclosure.

FIG. 4 shows a series of E-MBS MAPs 410, 420, 430, 440, and 450. Each of the E-MBS maps includes an indicator to indicate to the subscribing MSs as to when the subscribing MSs can decode the next E-MBS MAP. The indicator also can be referred to as an Allocation Lifetime. For example, the MAP decoding can be either configured by the MBS service provider based on when the service provider expects a change in parameters or is set by the MBS service provider as a rule that MSs must decode the MAP at a certain time even if the parameters have not changed.

In the embodiment shown in FIG. 4, E-MBS MAP 410 has an indicator 415, E-MBS MAP 420 has an indicator 425, E-MBS MAP 430 has an indicator 435, E-MBS MAP 440 has an indicator 445, and E-MBS MAP 450 has an indicator 455. In a specific embodiment, indicators 415-455 are configured to countdown the duration to the next E-MBS MAP parameter change. For example, the duration could be indicated using integer units of MSI, frames, or superframes. The length of counter can be configured by the MBS service provider.

As shown in FIG. 4, indicators 415-455 count down in units of MSI to the next parameter change. For example, if the MBS service provider wants the subscribing MSs to decode the E-MBS MAP every 32 minutes and the length of an MSI is 500 ms, then indicators 415-455 need 6 bits to count backwards from 011111 to 00000. This allows the MSs joining the service at any time during the 32 minute intervals to know how long the MSs can skip decoding E-MBS MAPs before waking up to decode the next E-MBS MAP. For example, an MS-A 460 decodes the E-MBS MAP 410 and uses indicator 415 to determine that MS-A 460 can sleep until E-MBS 450, which is the next MAP to decode. Similarly, an MS-B 470 decodes the E-MBS MAP 430 and uses indicator 435 to determine that MS-B 470 can sleep until E-MBS 450. Accordingly, both MS-A 460 and MS-B 470 wake up at E-MBS 450 and decode E-MBS 450. Compared to 13 bits in the 16e MBS MAP, the disclosed indicators 415-455 provide a savings of more than 50% in resources.

In another particular embodiment, indicators 415-455 provide the sequence number associated with the next transmission instance of the E-MBS MAP that the subscribing MSs are to decode. In such an embodiment, the E-MBS MAPs will have two fields. The first field would indicate the sequence number of the current E-MBS MAP, and indicators 415-455 would be the second field used to indicate the sequence number of the next E-MBS MAP to be decoded by all subscribing MSs. In one embodiment, the sequence numbers can be a number associated with the MSI, frame, or super-frame number and is chosen based on what creates the least overhead for the E-MBS MAP. Therefore, upon decoding the E-MBS MAP, the subscribing MSs acquire the sequence number of the current E-MBS MAP and the sequence number of the next E-MBS MAP decoding, and schedule idle time before waking up to decode the next E-MBS MAP that is to be decoded.

In yet another particular embodiment, the E-MBS MAP decoding is implicitly indicated as some integer multiple of a certain duration. For example, the MBS service provider can configure the transmission such that every E-MBS MAP carried in an MSI whose sequence number is an integer multiple of 1000 must be decoded. As a consequence, the subscribing MSs will decode the E-MBS MAP whenever the MSI sequence number of the E-MBS MAP becomes 1000n, where n=1, 2, 3, . . . . The E-MBS MAP would have a field to indicate the sequence number of the current MSI, and the subscribing MSs, upon decoding the E-MBS MAP, can compute the quiet duration before they have to decode the next E-MBS MAP and can schedule their sleep time appropriately.

In one example of such an embodiment, the sequence number of the next E-MBS MAP to be decoded is calculated using Equation 1 below:

$$\left\lceil \frac{\text{frame \#}}{MSI} \right\rceil = Mn, \quad [\text{Eqn. 1}]$$

where ⌈ ⌉ indicates the ceiling function, M is the duration, and n is a natural number. Although Equation 1 is shown as using the ceiling function in this example, one of ordinary skill in the art would recognize that a floor, truncate, or round function could also be used without departing from the scope of this disclosure.

FIG. 5 illustrates a table 500 for indicating a duration to a next E-MBS MAP to be decoded by a subscribing mobile station according to an embodiment of the disclosure. The embodiment of table 500 in FIG. 5 is for illustration only. Other embodiments of table 500 could be used without departing from the scope of this disclosure.

As shown in table 500, a row 501 indicates that a 2-bit value of '00' for indicators 415-455 would indicate to the subscribing MSs that the next E-MBS MAP whose sequence number is an integer multiple of 100 is to be decoded. Similarly, a row 503 indicates that a 2-bit value of '01' for indicators 415-455 would indicate to the subscribing MSs that the next E-MBS MAP whose sequence number is an integer multiple of 200 is to be decoded. A row 505 indicates that a 2-bit value of '10' for indicators 415-455 would indicate to the subscribing MSs that the next E-MBS MAP whose sequence number is an integer multiple of 500 is to be decoded. Also, a row 507 indicates that a 2-bit value of '11' for indicators 415-455 would indicate to the subscribing MSs that the next E-MBS MAP whose sequence number is an integer multiple of 1000 is to be decoded.

In a further embodiment, the E-MBS MAP decoding is triggered by packet loss. In such an embodiment, the subscribing MSs may or may not be informed as to when the transmission parameters can change, and may or may not be required to periodically decode the next E-MBS MAP even if the parameters do not change. Instead, the subscribing MSs will decode the next E-MBS MAP if they experience packet loss. Because there can be a few packet losses over time due to channel variations and other factors, every packet loss may trigger an E-MBS MAP decoding. To avoid that, the E-MBS MAP decoding trigger can be configured so that an E-MBS MAP is decoded after m consecutive packet losses or m packet losses within a certain period, where m is a variable parameter. In such an embodiment, indicators 415-455 could be used to indicate the parameter m, or the parameter m can be decided by each subscribing MSs' quality of service requirements.

Figure 6:
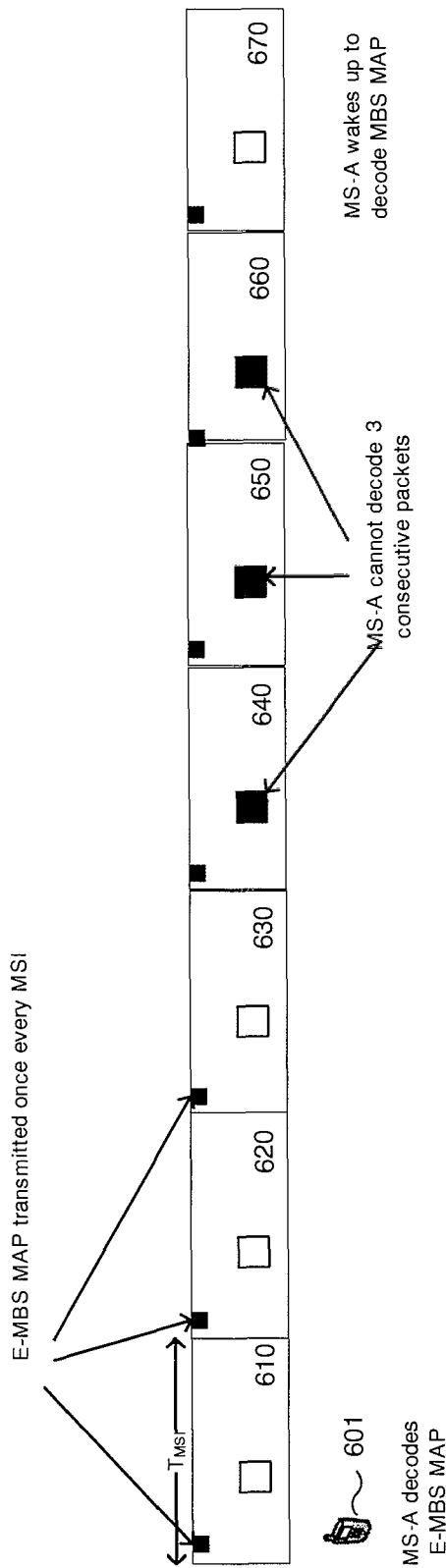
FIG. 6 illustrates a series of E-MBS MAPs according to an embodiment of the disclosure.

FIG. 6 illustrates a series of E-MBS MAPs according to an embodiment of the disclosure. The embodiment of the E-MBS MAPs illustrated in FIG. 6 is for illustration only. Other embodiments of the E-MBS MAPs could be used without departing from the scope of this disclosure.

As shown in FIG. 6, an MS-A 601 decodes an E-MBS MAP 610, an E-MBS MAP 620, and an E-MBS MAP 630. However, thereafter, MS-A 601 cannot decode an E-MBS MAP 640, an E-MBS MAP 650, and an E-MBS MAP 660. In this example, the parameter m indicates that a subscribing MS is to decode an E-MBS MAP after 3 consecutive packet losses. The parameter m could be provided to MS-A 601, for example, using indicators 415-455. As a result, MS-A 601 wakes up after 3 consecutive packet losses and decodes an E-MBS MAP 670.

Figure 7:
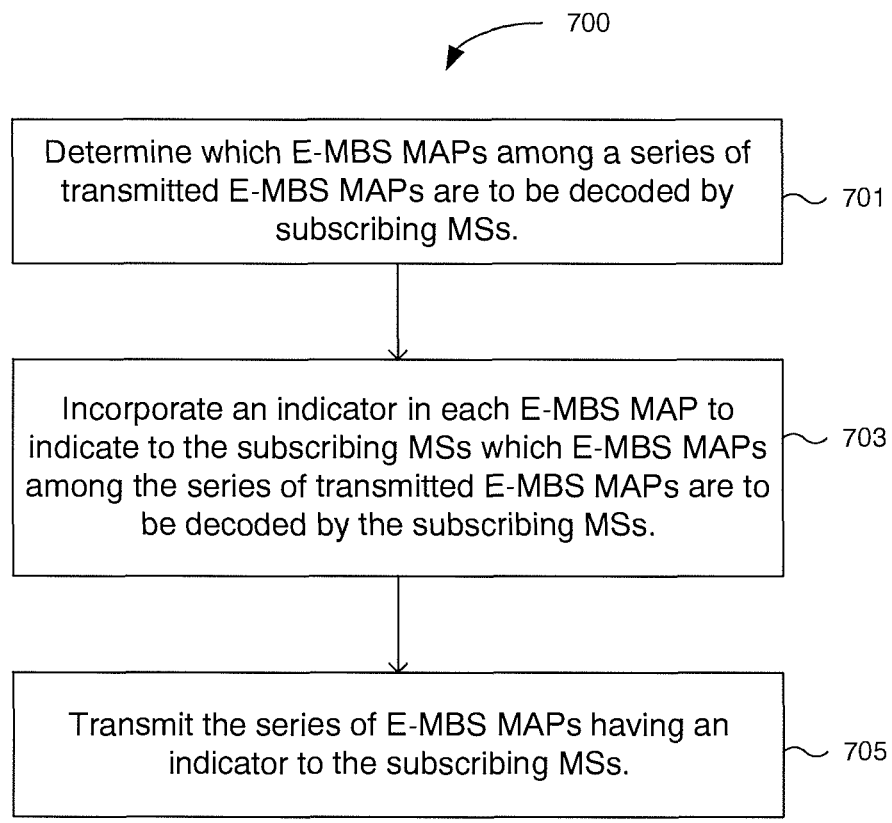
FIG. 7 illustrates a method of operating a base station according to an embodiment of the disclosure.

FIG. 7 illustrates a method 700 of operating a base station according to an embodiment of the disclosure. The embodiment of method 700 illustrated in FIG. 7 is for illustration only. Other embodiments of method 700 could be used without departing from the scope of this disclosure.

As shown in FIG. 7, a base station determines which E-MBS MAPs among a series of transmitted E-MBS MAPs are to be decoded by subscribing MSs (block 701). The base station then incorporates an indicator in each E-MBS MAP to indicate to the subscribing MSs which E-MBS MAPs among the series of transmitted E-MBS MAPs are to be decoded by the subscribing MSs (block 703). The indicator also can be referred to as an Allocation Lifetime. In some embodiments, the indicator may be a counter counting down in units of MSI to the next parameter change. In other embodiments, the indicator provides a sequence number of the next E-MBS MAP to be decoded by the subscribing MSs. In another embodiment, the indicator indicates that the next E-MBS MAP whose sequence number is an integer multiple of a certain number is to be decoded by the subscribing MSs. In further embodiments, the indicator provides a parameter for the subscribing MSs to use in determining when the subscribing MSs are to wake up and decode an E-MBS MAP. The base station then transmits the series of E-MBS MAPs having an indicator to the subscribing MSs (block 705).

Figure 8:
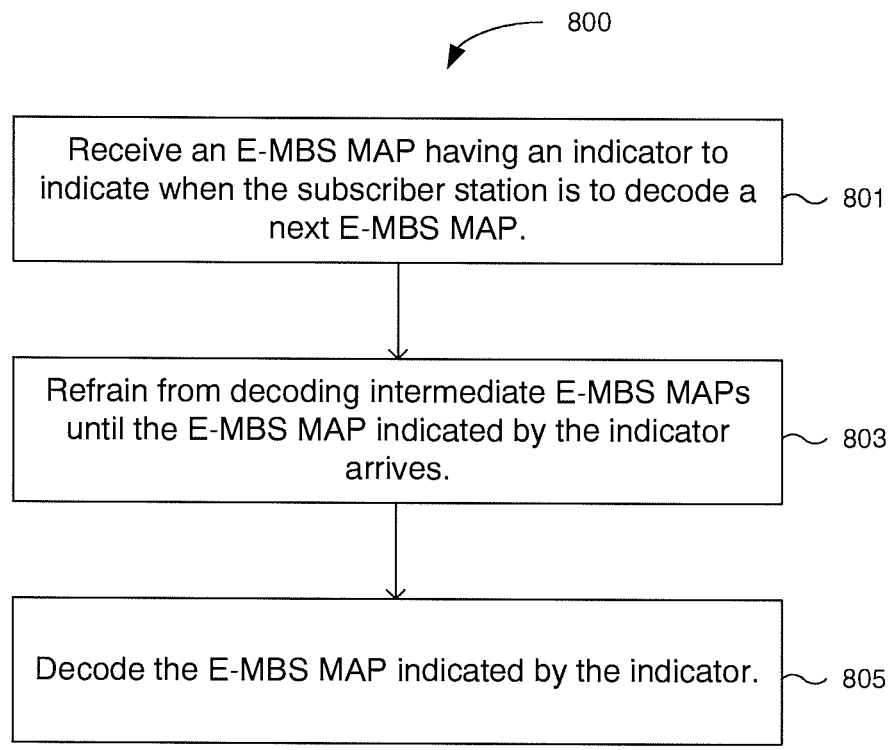
FIG. 8 illustrates a method of operating a mobile station or a subscriber station according to an embodiment of the disclosure.

FIG. 8 illustrates a method 800 of operating a mobile station or a subscriber station according to an embodiment of the disclosure. The embodiment of method 800 illustrated in FIG. 8 is for illustration only. Other embodiments of method 800 could be used without departing from the scope of this disclosure.

As shown in FIG. 8, a subscribing MS receives an E-MBS MAP having an indicator to indicate when the subscriber station is to decode a next E-MBS MAP (block 801). The indicator also can be referred to as an Allocation Lifetime. In some embodiments, the indicator may be a counter counting down in units of MSI to the next parameter change. In other embodiments, the indicator provides a sequence number of the next E-MBS MAP to be decoded by the subscribing MS. In another embodiment, the indicator indicates that the next E-MBS MAP whose sequence number is an integer multiple of a certain number is to be decoded by the subscribing MS. In further embodiments, the indicator provides a parameter for the subscribing MS to use in determining when the subscribing MS is to wake up and decode an E-MBS MAP. The subscribing MS then refrains from decoding intermediate E-MBS MAPs until the E-MBS MAP indicated by the indicator arrives (block 803). The subscribing MS then decodes the E-MBS MAP indicated by the indicator (block 805).

The disclosed system and method of the present disclosure also can be applied to the decoding of E-MBS configuration messages. Accordingly, the present disclosure also describes a method and system that reduces repeated and unnecessary decoding of E-MBS configuration messages by disclosing a signaling method and system that trigger the decoding of an E-MBS configuration message.

In 802.16m, information regarding the E-MBS configuration is necessary for proper E-MBS operation. This information is transmitted to the MSs using E-MBS configuration indicators. The E-MBS configuration information necessary for E-MBS operation include E-MBS-Zone_IDs of serving and neighboring ABSs, E-MBS Resource Allocation which includes the number of subframes reserved for E-MBS within a frame and the number of subbands reserved for E-MBS, E-MBS MAP time offset (frequency offset), E-MBS MAP resource allocation, E-MBS MAP Isizeoffset, E-MBS MAP MIMO Mode and MSTID and FID mappings between serving E-MBS Zone and neighboring E-MBS Zone for the same content. The above E-MBS configuration information is transmitted in a Medium Access Control (MAC) management message called an AAI-E-MBS_CFG message to be read only by the E-MBS MSs. The AAI-E-MBS_CFG message is to be transmitted once every MSI.

A user interested in an E-MBS transmission will first decode the AAI-E-MBS_CFG message. This configuration message will indicate the E-MBS resources and details necessary to decode the E-MBS MAP. Decoding the E-MBS MAP will then provide the parameters to decode the content of the E-MBS transmission.

As discussed above, the MBS parameters are stable and change very slowly. Hence, the configuration parameters in the AAI-E-MBS_CFG message are not expected to change very frequently. The slow variation of broadcast parameters can be used to reduce AAI-E_MBS_CFG message decoding. Considering that an AAI-E-MBS_CFG message contains the configuration parameters of E-MBS transmission in the entire MSI and can have parameters for numerous E-MBS zones, it is inefficient in terms of power usage at the MSs to decode the configuration message at every transmission instance.

To reduce repeated and unnecessary decoding of the AAI-EMBS_CFG message, in some embodiments, the present disclosure assumes that the AAI-EMBS_CFG message is transmitted in an interval that is an integer multiple of the MSI and is not decoded by subscribing MSs at every transmission instance. Such a design is currently under consideration in IEEE 802.16m. Accordingly, embodiments of this disclosure address the issue of signaling the triggers for AAI-EMBS_CFG message decoding by the subscribing MSs. This disclosure provides a signaling system and method that trigger AAI-EMBS_CFG message decoding.

In an embodiment of this disclosure, a counter called the EMBS_CFG_LIFETIME counter is included in the AAI-EMBS_CFG message. The EMBS_CFG_LIFETIME counter provides an indication to the subscribing MSs as to when the subscribing MSs can decode the next AAI-EMBS_CFG message.

Figure 9:
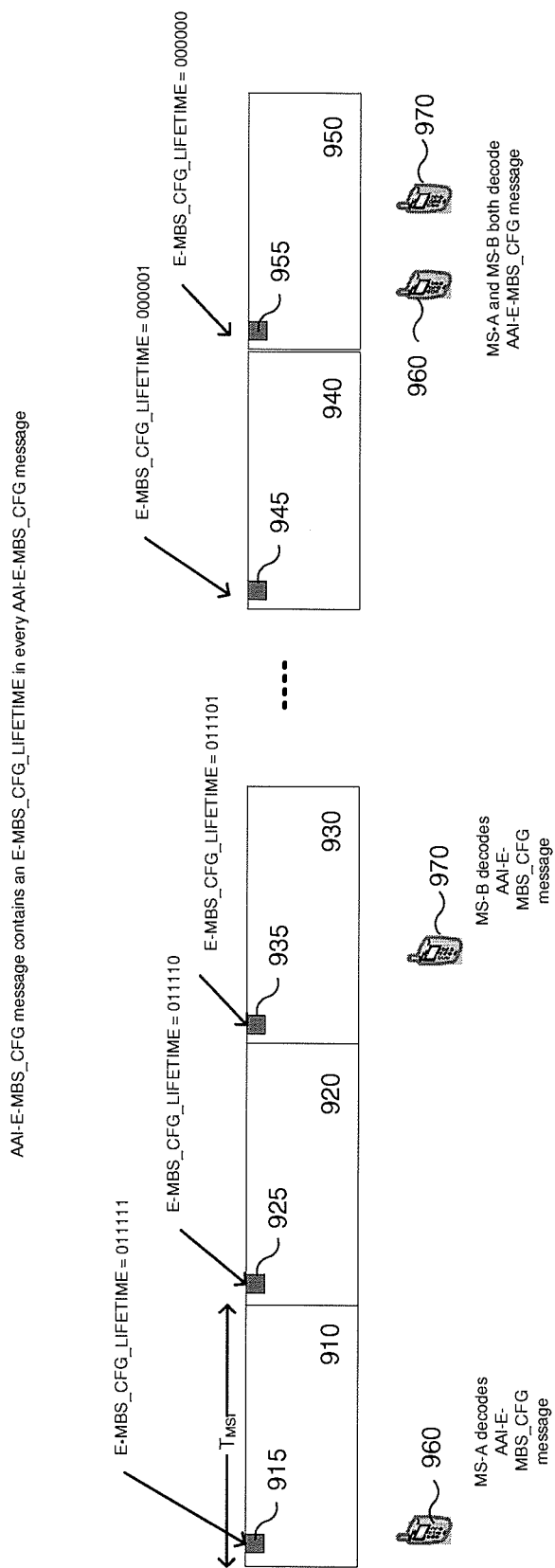
FIG. 9 illustrates a series of configuration messages having an indicator according to an embodiment of the disclosure.

FIG. 9 illustrates a series of configuration messages having an indicator according to an embodiment of the disclosure. The embodiment of the configuration messages illustrated in FIG. 9 is for illustration only. Other embodiments of the configuration messages could be used without departing from the scope of this disclosure.

FIG. 9 shows a series of configuration messages 910, 920, 930, 940, and 950. Each of the configuration messages includes an indicator to indicate to the subscribing MSs as to when the subscribing MSs can decode the next configuration message. In particular embodiments, the indicator also can be referred to as an EMBS_CFG_LIFETIME counter, and the configuration messages are AAI-EMBS_CFG messages. For example, AAI-EMBS_CFG message decoding can be either configured by the MBS service provider based on when the service provider expects a change in parameters or is set by the MBS service provider as a rule that MSs must decode the AAI-EMBS_CFG message at a certain time even if the parameters have not changed.

In the embodiment shown in FIG. 9, configuration message 910 has an indicator 915, configuration message 920 has an indicator 925, configuration message 930 has an indicator 935, configuration message 940 has an indicator 945, and configuration message 950 has an indicator 955. In a specific embodiment, indicators 915-955 are configured to countdown the duration to the next configuration message parameter change. Other examples of the indicator include integer units of MSI, frames, or superframes. The length of counter can be configured by the MBS service provider.

As shown in FIG. 9, indicators 915-955 count down in units of MSI to the next parameter change. For example, if the MBS service provider wants the subscribing MSs to decode the configuration message every 32 minutes and the length of an MSI is 500 ms, then indicators 915-955 need 6 bits to count backwards from 011111 to 00000. This allows the MSs joining the service at any time during the 32 minute intervals to know how long the MSs can skip decoding configuration messages before waking up to decode the next configuration message.

For example, an MS-A 960 decodes the E-MBS MAP 910 and uses indicator 915 to determine that MS-A 960 can sleep until configuration message 950, which is the next configuration message to decode. Similarly, an MS-B 970 decodes the configuration message 930 and uses indicator 935 to determine that MS-B 970 can sleep until configuration message 950. Accordingly, both MS-A 960 and MS-B 970 wake up at configuration message 950 and decode configuration message 950.

In another particular embodiment, indicators 915-955 provide the sequence number associated with the next transmission instance of the configuration message that the subscribing MSs are to decode. In such an embodiment, the configuration messages will have two fields. The first field would indicate the sequence number of the current configuration message, and indicators 915-955 would be the second field used to indicate the sequence number of the next configuration message to be decoded by all subscribing MSs. In one embodiment, the sequence numbers can be a number associated with the MSI, frame, or super-frame number and is chosen based on what creates the least overhead for the configuration message. Therefore, upon decoding the configuration message, the subscribing MSs acquire the sequence number of the current configuration message and the sequence number of the next configuration message decoding, and schedule idle time before waking up to decode the next configuration message that is to be decoded.

In yet another particular embodiment, the configuration message decoding is implicitly indicated as some integer multiple of a certain duration. For example, the MBS service provider can configure the transmission such that every configuration message carried in an MSI whose sequence number is an integer multiple of 1000 must be decoded. As a consequence, the subscribing MSs will decode the configuration message whenever the MSI sequence number of the configuration message becomes 1000n, where n=1, 2, 3, . . . . The configuration message would have a field to indicate the sequence number of the current MSI, and the subscribing MSs, upon decoding the configuration message, can compute the quiet duration before they have to decode the next configuration message and can schedule their sleep time appropriately.

In one example of such an embodiment, the sequence number of the next configuration message to be decoded is calculated using Equation 2 below:

$$\left\lceil \frac{\text{frame \#}}{MSI} \right\rceil = Mn, \quad \text{[Eqn. 2]}$$

where ⌈ ⌉ indicates the ceiling function, M is the duration, and n is a natural number. Although Equation 2 is shown as using the ceiling function in this example, one of ordinary skill in the art would recognize that a floor, truncate, or round function could also be used without departing from the scope of this disclosure.

Figure 10:
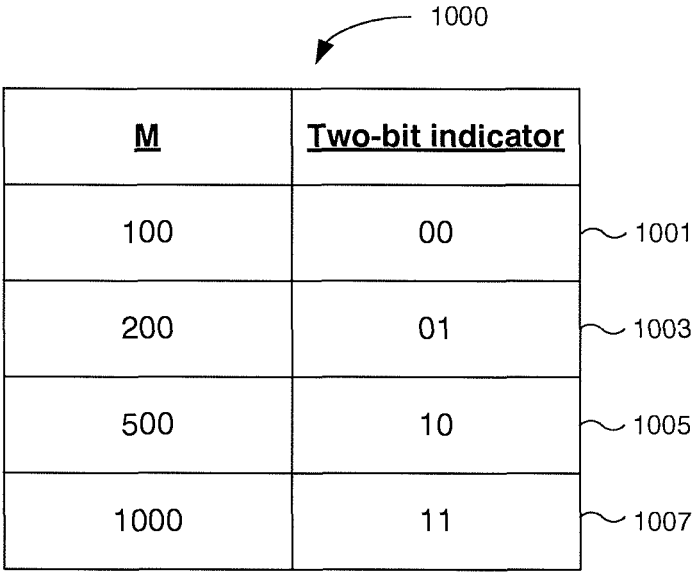
FIG. 10 illustrates a table for indicating a duration to a next configuration message to be decoded by a subscribing mobile station according to an embodiment of the disclosure.

FIG. 10 illustrates a table 1000 for indicating a duration to a next configuration message to be decoded by a subscribing mobile station according to an embodiment of the disclosure. The embodiment of table 1000 in FIG. 10 is for illustration only. Other embodiments of table 1000 could be used without departing from the scope of this disclosure.

As shown in table 1000, a row 1001 indicates that a 2-bit value of '00' for indicators 915-955 would indicate to the subscribing MSs that the next configuration message whose sequence number is an integer multiple of 100 is to be decoded. Similarly, a row 1003 indicates that a 2-bit value of '01' for indicators 915-955 would indicate to the subscribing MSs that the next configuration message whose sequence number is an integer multiple of 200 is to be decoded. A row 1005 indicates that a 2-bit value of '10' for indicators 915-955 would indicate to the subscribing MSs that the next configuration message whose sequence number is an integer multiple of 500 is to be decoded. Also, a row 1007 indicates that a 2-bit value of '11' for indicators 915-955 would indicate to the subscribing MSs that the next configuration message whose sequence number is an integer multiple of 1000 is to be decoded.

In a further embodiment, the configuration message decoding is triggered by packet loss. In such an embodiment, the subscribing MSs may or may not be informed as to when the transmission parameters can change, and may or may not be required to periodically decode the next configuration message even if the parameters do not change. Instead, the subscribing MSs will decode the next configuration message if the subscribing MSs experience packet loss. Because there can be a few packet losses over time due to channel variations and other factors, every packet loss may trigger a configuration message decoding. To avoid that, the configuration message decoding trigger can be configured so that a configuration message is decoded after m consecutive packet losses or m packet losses within a certain period, where m is a variable parameter. In such an embodiment, indicators 915-955 could be used to indicate the parameter m, or the parameter m can be decided by each subscribing MSs' quality of service requirements.

Figure 11:
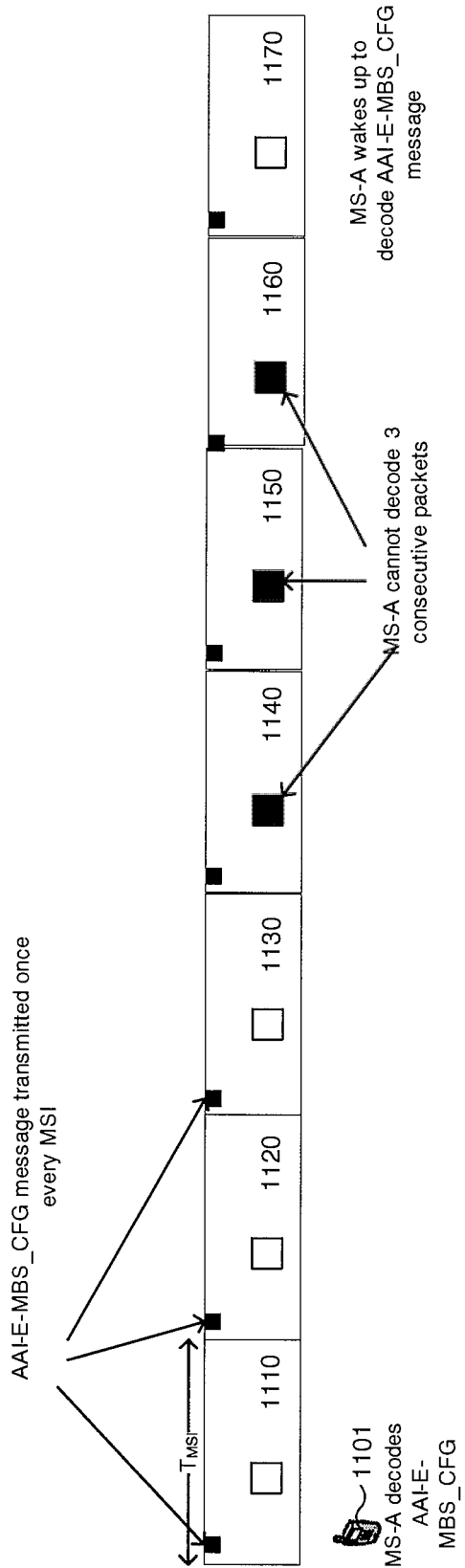
FIG. 11 illustrates a series of configuration messages according to an embodiment of the disclosure.

FIG. 11 illustrates a series of configuration messages according to an embodiment of the disclosure. The embodiment of the configuration messages illustrated in FIG. 11 is for illustration only. Other embodiments of the configuration messages could be used without departing from the scope of this disclosure.

As shown in FIG. 11, an MS-A 1101 decodes a configuration message 1110, a configuration message 1120, and a configuration message 1130. However, thereafter, MS-A 1101 cannot decode a configuration message 1140, a configuration message 1150, and a configuration message 1160. In this example, the parameter m indicates that a subscribing MS is to decode a configuration message after 3 consecutive packet losses. The parameter m could be provided to MS-A 1101, for example, using indicators 915-955. As a result, MS-A 1101 wakes up after 3 consecutive packet losses and decodes a configuration message 1170.

Figure 12:
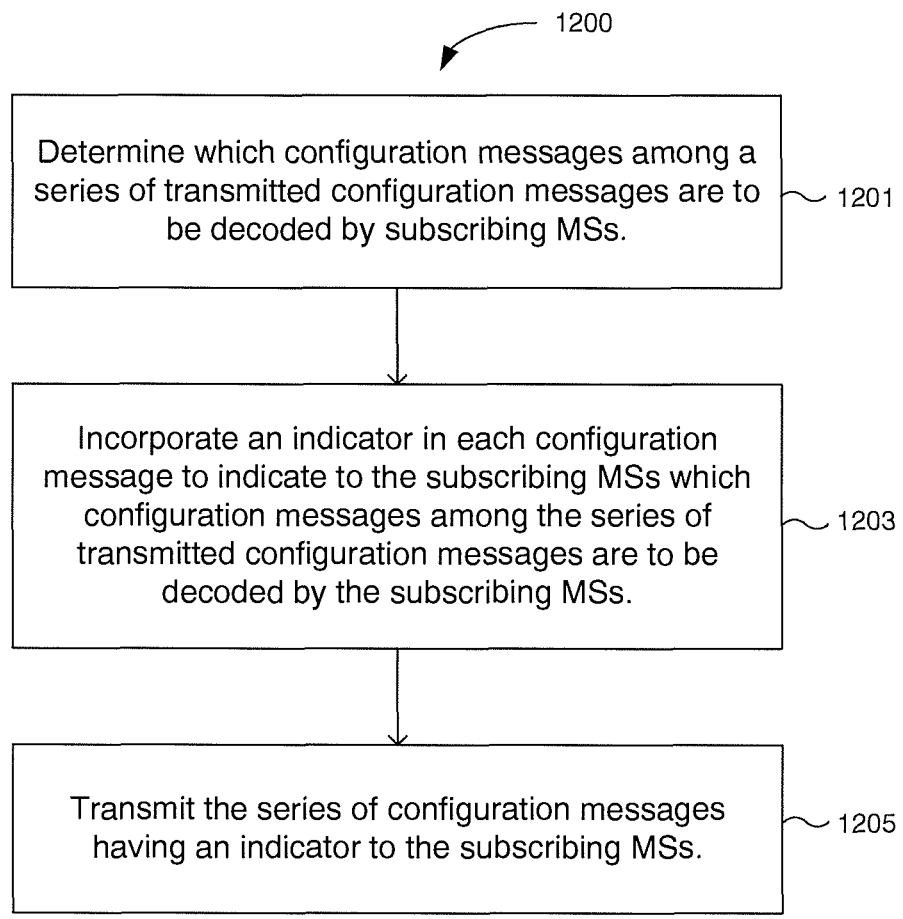
FIG. 12 illustrates a method of operating a base station according to another embodiment of the disclosure.

FIG. 12 illustrates a method 1200 of operating a base station according to another embodiment of the disclosure. The embodiment of method 1200 illustrated in FIG. 12 is for illustration only. Other embodiments of method 700 could be used without departing from the scope of this disclosure.

As shown in FIG. 12, a base station determines which configuration messages among a series of transmitted configuration messages are to be decoded by subscribing MSs (block 1201). The base station then incorporates an indicator in each configuration message to indicate to the subscribing MSs which configuration messages among the series of transmitted configuration messages are to be decoded by the subscribing MSs (block 1203). In particular embodiments, the indicator also can be referred to as an EMBS_CFG_LIFETIME counter, and the configuration messages are AAI-EMBS_CFG messages. In some embodiments, the indicator may be a counter counting down in units of MSI to the next parameter change. In other embodiments, the indicator provides a sequence number of the next configuration message to be decoded by the subscribing MSs. In another embodiment, the indicator indicates that the next configuration message whose sequence number is an integer multiple of a certain number is to be decoded by the subscribing MSs. In further embodiments, the indicator provides a parameter for the subscribing MSs to use in determining when the subscribing MSs are to wake up and decode a configuration message. The base station then transmits the series of configuration messages having an indicator to the subscribing MSs (block 1205).

Figure 13:
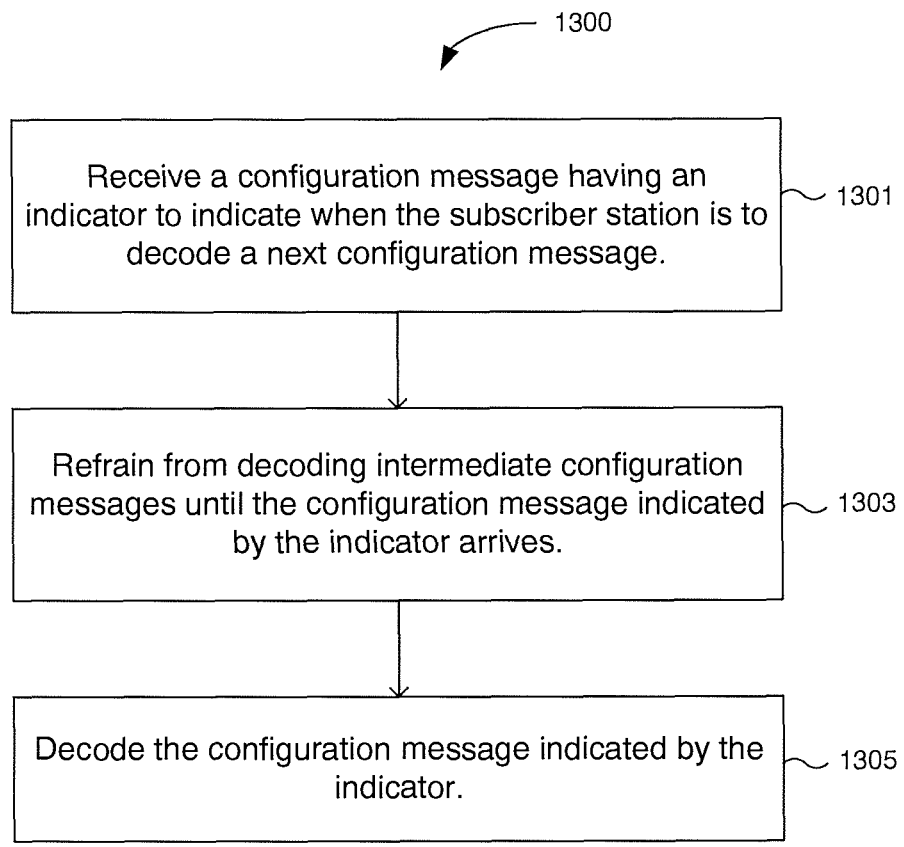
FIG. 13 illustrates a method of operating a mobile station or a subscriber station according to another embodiment of the disclosure.

FIG. 13 illustrates a method 1300 of operating a mobile station or a subscriber station according to another embodiment of the disclosure. The embodiment of method 1300 illustrated in FIG. 13 is for illustration only. Other embodiments of method 1300 could be used without departing from the scope of this disclosure.

As shown in FIG. 13, a subscribing MS receives an E-MBS MAP having an indicator to indicate when the subscriber station is to decode a next configuration message (block 1301). In particular embodiments, the indicator also can be referred to as an EMBS_CFG_LIFETIME counter, and the configuration messages are AAI-EMBS_CFG messages. In some embodiments, the indicator may be a counter counting down in units of MSI to the next parameter change. In other embodiments, the indicator provides a sequence number of the next configuration message to be decoded by the subscribing MS. In another embodiment, the indicator indicates that the next configuration message whose sequence number is an integer multiple of a certain number is to be decoded by the subscribing MS. In further embodiments, the indicator provides a parameter for the subscribing MS to use in determining when the subscribing MS is to wake up and decode a configuration message. The subscribing MS then refrains from decoding intermediate configuration messages until the configuration message indicated by the indicator arrives (block 1303). The subscribing MS then decodes the configuration message indicated by the indicator (block 1305).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
    a transmitter configured to transmit a downlink frame, the downlink frame comprising a first configuration message for Enhanced-Multicast Broadcast Service (E-MBS),
    wherein the first configuration message comprises a field with an indicator to indicate how frequently a subscriber station is to decode configuration messages, and
    wherein the subscriber station, upon decoding the first configuration message, is configured to determine how long the subscriber station can skip decoding subsequent configuration messages before decoding a second configuration message based on the indicator.

2. The base station in accordance with claim 1 wherein the second configuration message to be decoded by the subscriber station comprises a parameter change.

3. The base station in accordance with claim 2 wherein the parameter change is set by an E-MBS service provider, and wherein the indicator to indicate the second configuration message to be decoded is based on when the service provider expects a change in parameters.

4. The base station in accordance with claim 2 wherein the parameter change is set by an E-MBS service provider as a rule that subscriber stations are to decode a next configuration message at a particular time even if parameters have not changed.

5. The base station in accordance with claim 1 wherein the indicator is further defined as an Allocation Lifetime and is configured as a counter indicating a duration to the second configuration message or specified as a duration to the second configuration message to be decoded by the subscriber station.

6. The base station in accordance with claim 5 wherein the counter counts down the duration to the second configuration message to be decoded by the subscriber station.

7. The base station in accordance with claim 5 wherein the duration is indicated using integer units of E-MBS scheduling intervals (MSIs), frames, or superframes.

8. The base station in accordance with claim 5 wherein the duration is configured by an E-MBS service provider.

9. The base station in accordance with claim 1 wherein the indicator comprises:
   a first sequence number associated with the first configuration message; and
   a second sequence number associated with the second configuration message to be decoded by the subscriber station.

10. The base station in accordance with claim 9 wherein the first sequence number or the second sequence number comprises at least one of a frame number and a superframe number.

11. The base station in accordance with claim 1 wherein the indicator indicates that the subscriber station is to decode the second configuration message once a performance parameter has been met.

12. The base station in accordance with claim 11 wherein the performance parameter is at least one of a predetermined number of consecutive packet losses by the subscriber station and a predetermined number of total packet losses by the subscriber station within a predetermined time interval.

13. The base station in accordance with claim 1 wherein the indicator corresponds to a predetermined number, and the subscriber station decodes the second configuration message having a sequence number that is an integer multiple of the predetermined number.

14. The base station in accordance with claim 13 wherein the predetermined number is carried in a field of the first configuration message.

15. A method of operating a base station, the method comprising:
   transmitting a downlink frame, the downlink frame comprising a first configuration message associated with Enhanced-Multicast Broadcast Service (E-MBS),
   wherein the first configuration message comprises a field with an indicator to indicate how frequently a subscriber station is to decode configuration messages, and
   wherein the subscriber station, upon decoding the first configuration message, is configured to determine how long the subscriber station can skip decoding subsequent configuration messages before decoding a second configuration message based on the indicator.

16. The method in accordance with claim 15 wherein the second configuration message to be decoded by the subscriber station comprises a parameter change.

17. The method station in accordance with claim 16 wherein the parameter change is set by an E-MBS service provider, and wherein the indicator to indicate the second configuration message to be decoded is based on when the service provider expects a change in parameters.

18. The method in accordance with claim 16 wherein the parameter change is set by an E-MBS service provider as a rule that subscriber stations are to decode a next configuration message at a particular time even if parameters have not changed.

19. The method in accordance with claim 15 wherein the indicator is further defined as an Allocation Lifetime and is configured as a counter indicating a duration to the second configuration message or specified as a duration to the second configuration message to be decoded by the subscriber station.

20. The method in accordance with claim 19 wherein the counter counts down the duration to the second configuration message to be decoded by the subscriber station.

21. The method in accordance with claim 19 wherein the duration is indicated using integer units of E-MBS scheduling intervals (MSIs), frames, or superframes.

22. The method in accordance with claim 19 wherein the duration is configured by an E-MBS service provider.

23. The method in accordance with claim 15 wherein the indicator comprises:
   a first sequence number associated with the first configuration message; and
   a second sequence number associated with the second configuration message to be decoded by the subscriber station.

24. The method in accordance with claim 23 wherein the first sequence number or the second sequence number comprises at least one of a frame number and a superframe number.

25. The method in accordance with claim 15 wherein the indicator indicates that the subscriber station is to decode the second configuration message once a performance parameter has been met.

26. The method in accordance with claim 25 wherein the performance parameter is at least one of a predetermined number of consecutive packet losses by the subscriber station and a predetermined number of total packet losses by the subscriber station within a predetermined time interval.

27. The method in accordance with claim 15 wherein the indicator corresponds to a predetermined number, and the subscriber station decodes the second configuration message having a sequence number that is an integer multiple of the predetermined number.

28. The method in accordance with claim 27 wherein the predetermined number is carried in a field of the first configuration message.

29. A subscriber station comprising:
   a receiver configured to receive a downlink frame, the downlink frame comprising a first configuration message associated with Enhanced-Multicast Broadcast Service (E-MBS),
   wherein the first configuration message comprises a field with an indicator to indicate how frequently a subscriber station is to decode configuration messages, and
   wherein the subscriber station, upon decoding the first configuration message, is configured to determine how long the subscriber station can skip decoding subsequent configuration messages before decoding a second configuration message based on the indicator.

30. The subscriber station in accordance with claim 29 wherein the second configuration message to be decoded by the subscriber station comprises a parameter change.

31. The subscriber station in accordance with claim 30 wherein the parameter change is set by an E-MBS service provider, and wherein the indicator to indicate the second configuration message to be decoded is based on when the service provider expects a change in parameters.

32. The subscriber station in accordance with claim 30 wherein the parameter change is set by an E-MBS service provider as a rule that subscriber stations are to decode a next configuration message at a particular time even if parameters have not changed.

33. The subscriber station in accordance with claim 29 wherein the indicator is further defined as an Allocation Lifetime and is configured as a counter indicating a duration to the second configuration message or specified as a duration to the second configuration message to be decoded by the subscriber station.

34. The subscriber station in accordance with claim 33 wherein the counter counts down the duration to the second configuration message to be decoded by the subscriber station.

35. The subscriber station in accordance with claim 33 wherein the duration is indicated using integer units of E-MBS scheduling intervals (MSIs), frames, or superframes.

36. The subscriber station in accordance with claim 33 wherein the duration is configured by an E-MBS service provider.

37. The subscriber station in accordance with claim 29 wherein the indicator comprises:
   a first sequence number associated with the first configuration message; and
   a second sequence number associated with the second configuration message to be decoded by the subscriber station.

38. The subscriber station in accordance with claim 37 wherein the first sequence number or the second sequence number comprises at least one of a frame number and a superframe number.

39. The subscriber station in accordance with claim 29 wherein the indicator indicates that the subscriber station is to decode the second configuration message once a performance parameter has been met.

40. The subscriber station in accordance with claim 39 wherein the performance parameter is at least one of a predetermined number of consecutive packet losses by the subscriber station and a predetermined number of total packet losses by the subscriber station within a predetermined time interval.

41. The subscriber station in accordance with claim 29 wherein the indicator corresponds to a predetermined number, and the subscriber station decodes the second configuration message having a sequence number that is an integer multiple of the predetermined number.

42. The subscriber station in accordance with claim 41 wherein the predetermined number is carried in a field of the first configuration message.

\* \* \* \* \*